United States Patent [19]

Wang

[11] Patent Number: 5,157,318
[45] Date of Patent: Oct. 20, 1992

[54] STRUCTURE OF BATTERY CHARGER FOR DIFFERENT SIZE AND SPECIFICATION BATTERIES

[75] Inventor: Fu C. Wang, Taipei, Taiwan

[73] Assignee: Jen Jong Chen, Tansui Taipei Hsien, Taiwan

[21] Appl. No.: 762,554

[22] Filed: Sep. 18, 1991

[51] Int. Cl.$^5$ .......................................... H01M 10/44
[52] U.S. Cl. ........................................... 320/2; 320/15
[58] Field of Search ......................... 320/2, 15, 20, 21

[56] References Cited

U.S. PATENT DOCUMENTS 4,816,735  3/1989  Cook et al. ............................... 320/2
5,057,761  10/1991 Felegyhazi, Sr. ......................... 320/2

Primary Examiner—Steven L. Stephan
Assistant Examiner—Matthew Nguyen
Attorney, Agent, or Firm—Bucknam and Archer

[57] ABSTRACT

A battery charger comprising an indicator unit which has control switch and indicator lamps, and three charging slots for charging a variety of batteries of different size and specification, wherein one of the charging slots has vertical guide rails for holding the battery inserted therein and positive and negative charging pins and charging terminals, each of the other two charging slots has plate springs and wire spring for holding different size of battery in charging position and charging pins or charging strip springs for charging the battery inserted therein.

5 Claims, 4 Drawing Sheets 5,157,318

STRUCTURE OF BATTERY CHARGER FOR DIFFERENT SIZE AND SPECIFICATION BATTERIES

BACKGROUND OF THE INVENTION

The present invention relates to a battery charger and relates more particularly to such a battery charger having three charging slots for charging batteries of different size and specification.

From desk top computers to notebook computers and from fixed type of desk telephones to mobile telephones, office machines as well as some other electric and electronic appliances and instruments have been commonly made portable for convenient use. For a portable electric or electronic device, AC power supply is generally required. Therefore, a battery has become a requisite part the device which provides the device with the necessary working voltage. Because waste batteries may cause severe environmental pollution problem, a rechargeable battery such as a nickel-cadmium battery has become more popular. However, a rechargeable battery should be recharged regularly so as to provide sufficient power supply. An electric or electronic device which consumes considerable power is generally equipped with a cartridge type of rechargeable battery. Since there are a variety of cartridge type of rechargeable batteries from different manufactures different battery chargers may be required for charging different size or specification of cartridge type of rechargeable battery. The present invention has been accomplished to eliminate this problem. It is therefore the main object of the present invention to provide a battery charger which is practical for charging any of a variety of cartridge type of batteries of different size and specification.

DETAILED DESCRIPTION OF THE PREFERRED EMBODIMENT

Figure 1:
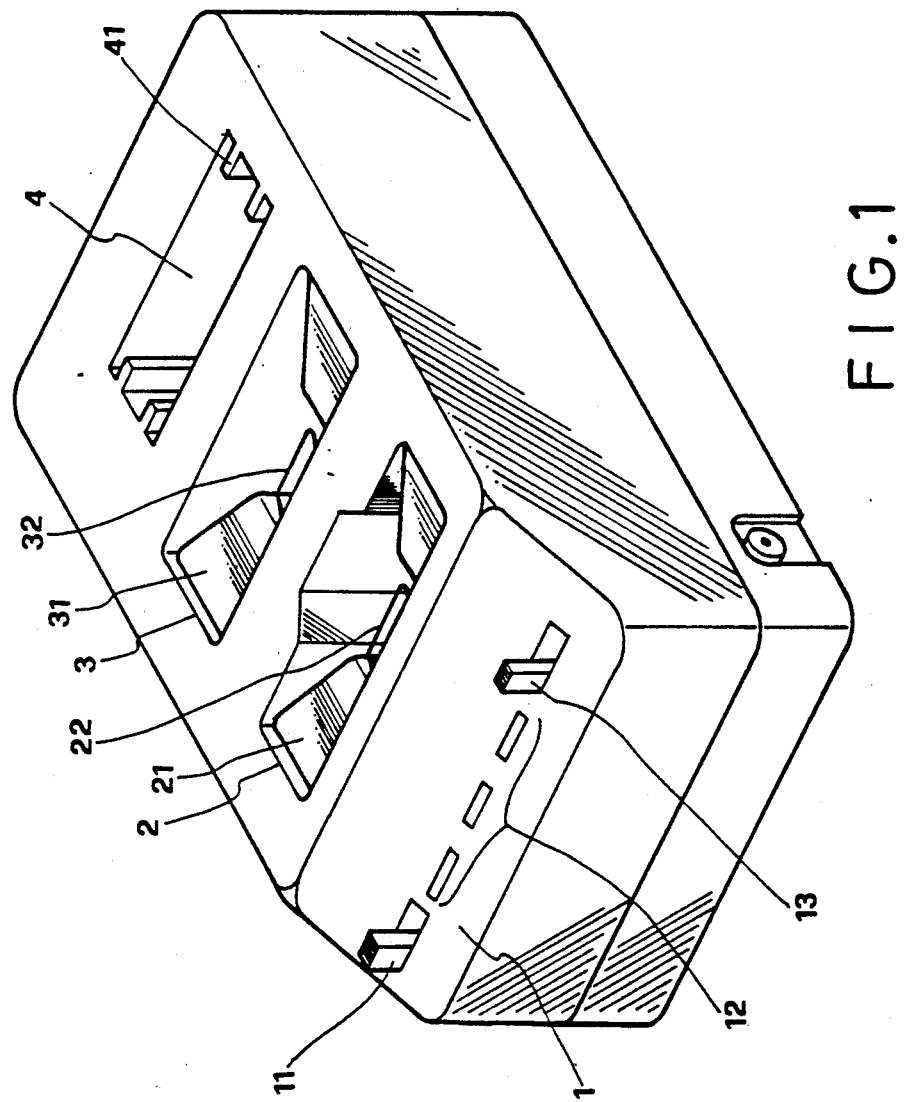
FIG. 1 is a perspective view of a battery charger embodying the present invention.

Referring to the annexed drawings in great detail, therein illustrated is the preferred embodiment of the battery charger of the present invention which is generally comprised of an indicator unit 1, a front charging slot 2, an intermediate charging slot 3, and a rear charging slot 4. The battery charger further comprises a power socket for connecting to a power supply.

The indicator unit 1 is comprised of a positive/negative selector switch 11, three indicator lamps 12 for indicating the charging condition of the front charging slot 2, the intermediate charging slot 3 and the rear charging slot 3 respectively, and a voltage selector switch 13. Each part of the indicator unit 1 has a circuit through which working voltage is connected (this is of the known art and not within the scope of the present invention).

Figure 2:
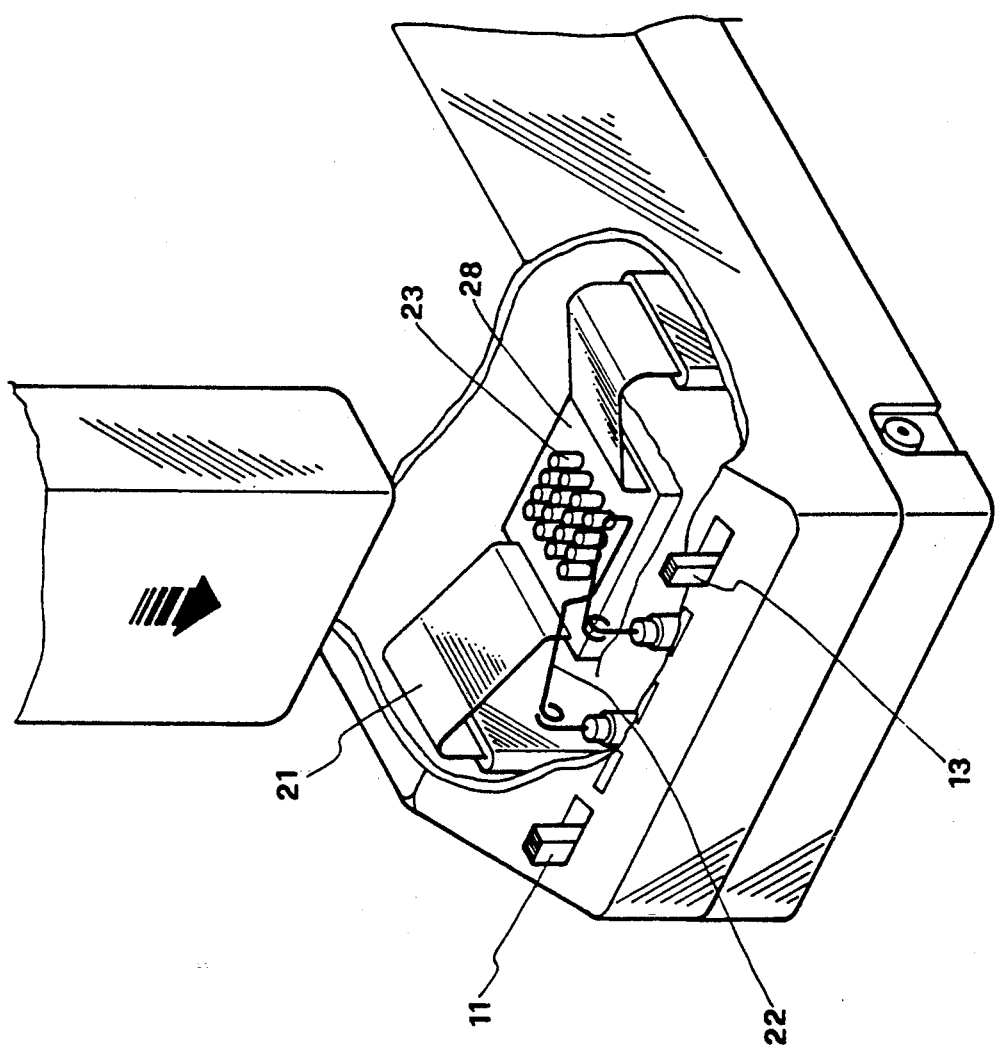
FIG. 2 is a similar view partly broken away to illustrate the internal structure of the front charging slot.
Figure 3:
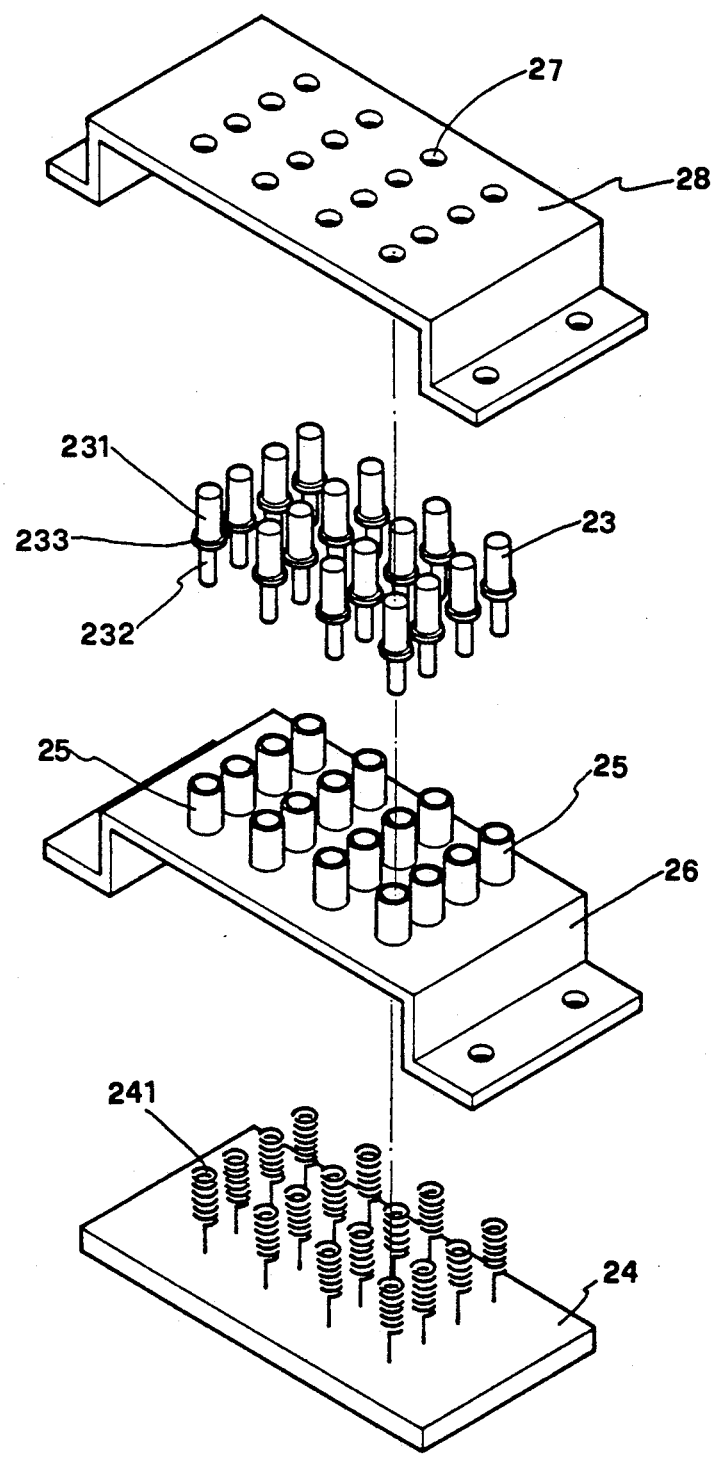
FIG. 3 is an exploded perspective view of the charging PC board, the holder plate, the charging pins and the guide plate.

The front charging slot 2 comprises two retaining plate springs 21 bilaterally obliquely extending inwards, and a wire spring 22 on the front wall thereof. Because of the arrangement of the plate springs 21 and the wire spring 22, any battery cartridge of different size which can be inserted into the front charging slot 2 can be firmly retained in place. The front charging slot 2 further comprises a plurality of charging ping 23 vertically disposed at the bottom, of the slot each of which is comprised of a bottom rod 232 (FIG. 3) at the bottom, a top rod 231 longitudinally alinged with said bottom rod 232 at the top and made in diameter relatively larger than said bottom rod 232, and a collar 233 at the middle. The bottom structure of the front charging slot 2 is as shown in FIGS. 2 and 3. A charging PC board 24 which has a plurality of spring coils 241 on the top edge thereof is set at the bottom, of the slot a holder plate 26 which has a plurality of pin holes 25 corresponding to the spring coils 24 on the charging PC board 24 is mounted on the charging PC board 24 at the top permitting the spring coils 241 to be respectively received inside the pin holes 231. The charging pins 23 are mounted on the holder plate 26 with the bottom rods 232 thereof respectively inserted into the pin holes 25 and disposed in contact with the spring coils 241. A guide plate 28 which has a plurality of holes 27 thereon is mounted on the holder plate 26 at the top permitting the top rods 231 of the charging pins 23 to be movably held in the holes 27 thereon. Because each charging pin 23 has a collar 233 at the middle between the top rod 231 and the bottom rod 232, once the guide plate 28 and the holder plate 26 are fastened in the base plate (not shown) inside the battery charger, the collar 233 of each charging pin 23 will be stopped at the bottom edge of the guide plate 28 when the battery charger is turned upside-down. Therefore, the charging pins 23 will not drop from the battery charger. When a battery is inserted in the front charging slot 2, each charging contact of the battery is automatically disposed in contact with either charging pin 28 while the other charging pins 23 are forced downwards by the casing of the battery so as not to interfere with charging operation. Therefore, the front charging slot 2 is suitable for charging batteries of different size or having charging contacts at different locations.

Figure 4:
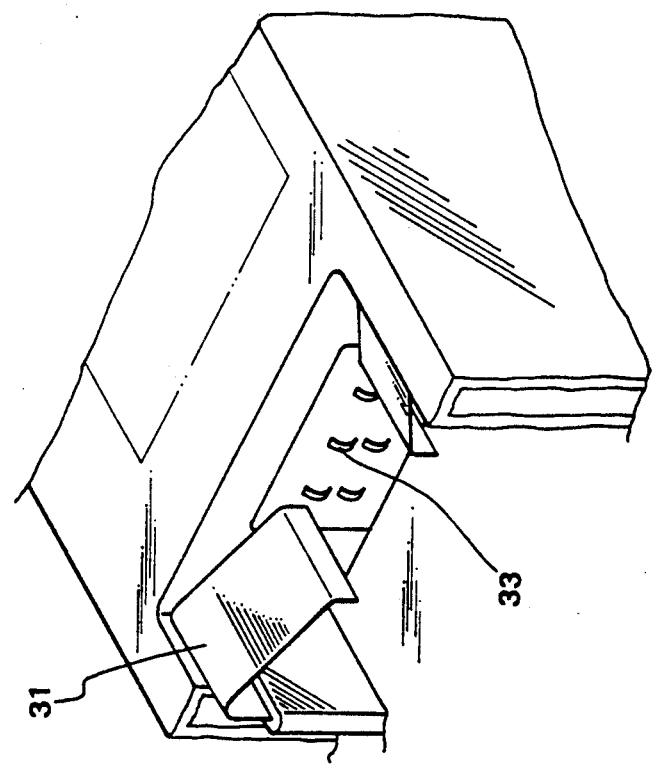
FIG. 4 is a fragmentary, perspective view which illustrates the internal structure of the intermediate charging slot.

The internal structure of the intermediate charging slot 3 is shown in FIGS. 1 and 4. The intermediate charging slot 3 comprises two retaining plate springs 31 bilaterally obliquely extending inwards, a wire spring 32 on the front wall thereof for holding the battery to be charged, and a plurality sets of curved, charging strip springs 33 on the back wall thereof. This intermediate charging slot 2 is suitable for charging the batteries which have charging contacts located at the peripheral side wall thereof.

Figure 5:
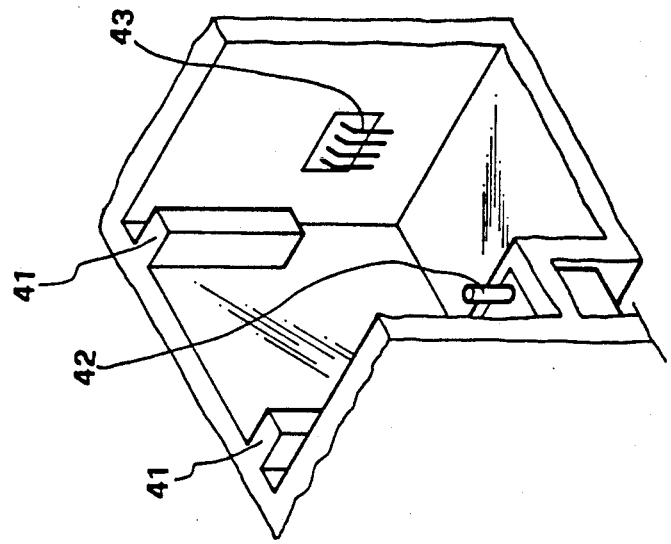
FIG. 5 is a similar view which illustrates the internal structure of the rear charging slot.

Referring to FIG. 5, the rear charging slot 4 has two pairs of guide rails 41 vertically disposed on the two opposite side walls thereof for guiding and holding the battery inserted therein, and positive and negative charging pins 42 and charging terminals 43 respectively mounted on the front and rear walls thereof for charging any battery which has two pin holes for charging purpose.

As indicated, the present invention is to provide such a battery charger having three different charging slots for charging any of a variety of batteries of different size and specification, which completely eliminates matching problem. However, it is to be understood that the drawings are designed for purposes of illustration only, and are not intended as a definition of the limits and scope of the invention disclosed. Various modifications could be made to the present invention without departing from the basic teachings thereof.

What is claimed is:

1. A battery charger comprising:
   a housing;
   an indicator unit in said housing, said indicator unit comprising at least one positive/negative selector switch, a plurality of indicator lamps, a voltage selector switch and a power socket, said selector switches, lamps and power socket being electrically connected together;
   a first charging slot for insertion of a first battery to be charged, said first charging slot being a recessed hole in said housing defined by a front wall, two opposite side walls, and a bottom and comprising a first pair of retaining plate springs bilaterally obliquely extending inwards from said opposite side walls and a first wire spring on said front wall for holding said first battery therein, a charging PC board at said bottom of said first charging slot electrically connected to said indicator unit, said charging PC board having a plurality of spring coils mounted thereon, a holder plate mounted over said charging PC board, said holder plate having a plurality of pin holes for the insertion therein of said spring coils respectively, a guide plate mounted over said holder plate and having a plurality of guide holes therein, and a plurality of charging pins inserted in said pin holes on said holder plate and guided by said guide holes on said guide plate;
   a second charging slot for insertion of a second battery to be charged, said second charging slot being a recessed hole in said housing defined by a front wall, two opposite side walls and a rear wall and comprising a second pair of retaining plate springs bilaterally obliquely extending inwards from said opposite side wall of said second charging slot and a second wire spring on said front wall of said second slot for holding said second battery therein, and a plurality sets of curved, charging strip springs on said rear wall electrically connected to said indicator unit for charging said second battery; and
   a third charging slot for insertion of a third battery to be charged, said third charging slot being a recessed hole in said housing defined by a front wall, two opposite side walls and a rear wall and comprising a pair of guide rails disposed transversely along each one of said two opposite side walls of said third charging slot for guiding and holding said third battery therein, and positive and negative charging pins and charging terminals respectively mounted on said front and rear walls of said third charging slot and connected to said indicator unit for charging said third battery.

2. The battery charger of claim 1, wherein the locations of said first, second and third charging slots can be alternatively arranged on said battery housing.

3. The battery charger of claim 1, wherein each of said charging pins comprises a bottom rod inserted in one of said pin holes on said holder plate in contact with one of said spring coils, a top rod inserted in one of said guide holes on said guide plate, and a collar formed between said top rod and said bottom rod of a size greater than said one of said pin holes such that said collar is retained between said holder plate and said guide plate.

4. A battery charger comprising:
   a housing;
   an indicator unit in said housing, said indicator unit comprising at least one indicator lamp and an electrical circuit for providing a charging voltage for charging a battery; and
   a charging slot for insertion of said battery to be charged, said charging slot being a recessed hole in said housing defined by a front wall, two opposite side walls, and a bottom and comprising two retaining plate springs bilaterally obliquely extending inwards from said opposite side walls and a wire spring mounted to said front wall for holding said battery when inserted into said slot, a charging PC board at said bottom of said charging slot electrically connected to said indicator unit, said charging PC board having a plurality of spring coils mounted thereon, a holder plate mounted over said charging PC board and having a plurality of pin holes for the insertion thereon of said spring coils respectively, a guide plate mounted over said holder plate and having a plurality of guide holes therein, and a plurality of charging pins inserted in said pin holes on said holder plate and guided by said guide holes on said guide plate.

5. The battery charger of claim 4, wherein each of said charging pins comprises a bottom rod inserted in one of said pin holes on said holder plate in contact with one of said spring coils, a top rod inserted in one of said guide holes on said guide plate and a collar formed between said top rod and said bottom rod of a size greater than said one of said pin holes such that said collar is retained between said holder plate and said guide plate.

* * * * *